July 2, 1957 R. A. HIGONNET ET AL 2,797,613

MODIFICATION OF TYPE CONFIGURATIONS

Filed May 12, 1953

INVENTORS
RENÉ A. HIGONNET
LOUIS M. MOYROUD
BY Kenway Jenney Witter & Hildreth
ATTORNEYS 2,797,613
Patented July 2, 1957

2,797,613

MODIFICATION OF TYPE CONFIGURATIONS

René A. Higonnet and Louis M. Moyroud, Cambridge, Mass., assignors to Graphic Arts Research Foundation, Inc., Cambridge, Mass., a corporation of Delaware Application May 12, 1953, Serial No. 354,582

6 Claims. (Cl. 88—24)

The present invention relates to a method and apparatus for controlled optical distortion or modification of the configuration of a given type face and for photographic recordation of the distorted image.

In our copending application, Serial No. 770,320, filed August 23, 1947, we have described a photographic type composing machine employing a continuously revolving disk or drum upon which characters of type, preferably in the form of transparencies, are mounted upon a continuously revolving disk or drum. The present invention provides a method which may be used for designing characters suitable to be mounted on the disk or drum of such a machine, by controlled optical distortion of a given set or matrix of characters, but it will be understood that it may also be used in designing type positives or transparencies for use in any type of composing apparatus whatever, whether or not such apparatus employs a movable character carrier.

In our copending application, Serial No. 269,056, filed January 30, 1952, now Patent No. 2,736,249, we have described various forms of type composing apparatus, in which the characters are disposed upon a continuously moving character carrier, and in which selected characters are projected successively upon a sensitized film, the optical system being such that the exposure of each character takes place progressively through relative motion between a narrow image of an illuminated slit or aperture and the character upon which it impinges. The arrangement described is such that the image of the character on the film is clear and distinct although the character itself is continously moving during the exposure.

In general, the system described in the latter application involves the illumination of slits or apertures arranged in a circle on a disk rigidly connected with the character disk, and the projection of the slit images successively upon the character disk, each slit image being associated with a particular character. A separate optical system focuses a character thus illuminated upon the sensitized film. Since the slit image is narrow relative to the character, it illuminates only a part thereof, and by reason of the optical system by which the slit is focused upon the character, the slit image moves across or relative to the face of the character until the entire character has been projected upon the film.

As described further in said application, the apparatus is capable of adjustment to produce any one of three principal conditions: Case I in which the character and the slit image are moving in opposite directions; Case II in which the character and the slit image are moving in the same direction, but with the character moving faster; and Case III in which the character and the slit image are moving in the same direction, but with the slit image moving faster. In each of these cases certain limitations and properties of the system are set forth and described.

According to the present invention, a method is employed which in certain respects resembles that which is involved in said application. However, the optical principles are here employed for an entirely different purpose, namely, the designing of the type itself. We also provide a new and improved structure especially adapted for carrying out the distinctive purposes of the present invention.

A principal object of the present invention is to provide means for distorting a given font or style of type faces in a controlled manner to produce new type faces corresponding to new fonts or styles.

A further object of the invention is to provide means for distorting erect characters, as in the Roman style, to produce slanted characters, such as italics for example. In composing machines using movable type it is not ordinarily feasible to design the characters so that they "overlap," that is, so that a vertical line on the page passes through two adjacent characters. However, in photographic type composition there is no such inherent limitation, and therefore the slant of the characters may extend over a considerably greater range than which is available in movable type.

A further object is to provide an apparatus suitable for expanding or condensing a given font or style of characters, that is, increasing or decreasing the widths relative to the heights. It will be apparent that this type of distortion may also be necessary or useful in conjunction with distortion by slanting the characters. Thus, for example, in production of italic type, it is ordinarily desired both to slant and to condense the type faces relative to their dimensions in Roman type.

With the above objects in view, a principal feature of the present invention resides in the employment of an optical system, in which the characters to be distorted are disposed in a fixed projection axis, and in which they are projected on to a fixed film in the said axis through a movable optical system having mounted thereon a lens and an opaque member having a slit. These members are mounted upon a suitable carriage which carries them through the projection axis, the motion causing an image of the character which is focused upon the opaque member to move relative to the slit, thus progressively projecting an image of the character upon the film. The required kind and degree of optical distortion of the image is produced by appropriate adjustments including the slant of the slit or of the focus of the movable lens, or both.

Other features of the invention relate to various methods, arrangements, structures and relationships hereinafter described with reference to a preferred embodiment, and specifically defined in the claims.

Figure 1:
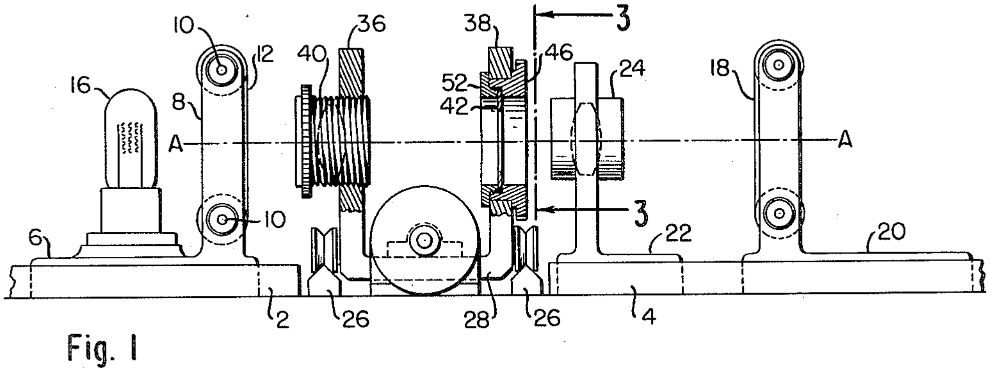
Fig. 1 is a side elevation of the projection apparatus.

Referring to the drawings, 2 and 4 represent fixed ways or guides mounted rigidly upon a suitable frame or table. A slidable frame 6 is mounted within the guides 2 and has a pair of vertical support posts 8. A pair of rods 10, to support a film 12 on suitable rollers, are rotatably mounted in the posts 8. A knurled knob 14 on each of the rods provides means for advancing the film 12. Upon the film are mounted character transparencies which are movable selectively into a position in a fixed projection axis designated by the dash-dot line AA. An incandescent lamp 16, or other suitable source of continuous illumination including monochromatic light sources, is placed in position to project an image of a character in the said axis through the movable optical system hereinafter to be described to a sensitive film 18 supported upon a slide 20 in the same manner as the film 12.

Also mounted upon the ways 4 is a slide 22 supporting a projection lens 24 which focuses the image on the film 18.

Interposed between the film 12 and the lens 24 is a movable optical system mounted upon a pair of rails 26 positioned at right angles to the axis A—A. A movable carriage 28 is supported by wheels upon the rails 26, and may be driven along the rails for a short distance, in either direction from that shown in the drawings, by a motor 30 having a threaded shaft 32 engageable with a threaded sleeve 34 secured to the carriage.

The carriage 28 has a pair of vertically extended walls 36 and 38. The wall 36 supports a suitable variable focus lens 40 having external threads on its body engaging with threads in the wall and a suitable knob or knurled ring for making adjustments of the focus.

Figures 2, 3:
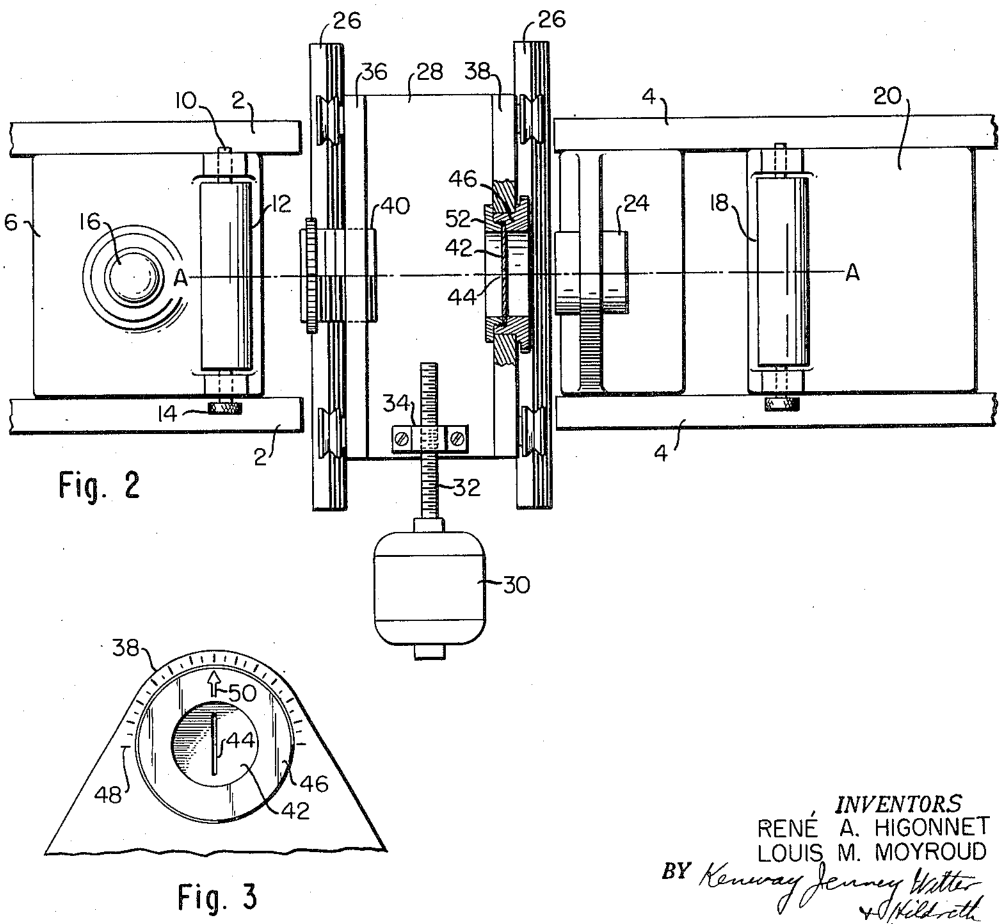
Fig. 2 is a top elevation of said apparatus.
Fig. 3 is a fragmentary end elevation taken on lines 3—3 of Fig. 1.

The wall 38, also shown in Fig. 3, provides a support for an opaque member 42 having a narrow diametral slit 44 therein, which passes through the axis A—A and through which light may be projected. The member 42 is supported within a sleeve member 46 having a knurled ring for adjustments of the slit position relative to the vertical. Suitable indicia 48 may be engraved on or otherwise applied to the wall 38 for registration with a mark 50 on the sleeve 46. A flanged retainer ring 52 is threaded into the sleeve 46 and against the member 42 to hold it securely in position.

The operation of the apparatus will next be described. It will be assumed for purposes of discussion that a particular character, such as the "A" in Roman type, has been brought into position in the projection axis A—A by appropriate movement of the film 12. If it is desired to produce an expanded or condensed image of this character, the opaque member 42 is turned until the slit 44 is vertically aligned as shown in Fig. 3. The base line of the "A" is assumed to be perpendicular to the margins of the film 12.

The lens 40 and the position of the slide 6 in its ways 2 are then mutually adjusted in a manner hereinafter more fully described to project an image of the character in focus upon the opaque member 42. Also, the carriage 28 is moved upon the rails 26 to a starting position in which the lens 40 projects the entire image of the "A" to one side of the slit 44. After the sensitized film 18 is brought into position to receive the projection, the exposure may be initiated.

During the entire exposure period the lamp 16 is continuously illuminated. A voltage is applied to the motor 30 which propels the carriage 28, thereby moving the lens 40 and the slit 44 through the projection axis A—A and beyond, until the carriage again reaches a position in which the entire image of the "A" is projected by the lens 40 to the other side of the slit 44. During the motion of the carriage 28 the lens 40 causes the character image to sweep across the slit 44, and the actual time involved in the exposure of the entire character is the time "t" measured from the instant when the first part of the image comes into alignment with the slit opening to the instant when the last part of the character image moves out of alignment with the opening. The time E is conveniently defined as the actual exposure time during which any given point in the character image remains in the slit aperture.

The lens 24 is arranged on the ways 4 to focus an image of the slit 44 in any desired enlargement upon the film 18. Thus, during the time "t" the character "A" is progressively exposed upon the film 18 in a manner generally similar to that described in said application, Serial No. 269,056.

As described in our said application, the degree of distortion in the exposure, and whether it produces expansion or condensation in the final image width, depend upon the magnification M introduced by the lens 40, that is upon the speed of the slit relative to that of the image projected upon it. The apparatus in said application is not entirely similar to the present apparatus. In the former the character and associated slit are rigidly connected together and moved relatively to an intermediate stationary lens, whereas in the latter, the character is stationary and the intermediate lens 40 is rigidly connected with the slit and moves with it through the projection axis. However, it will be understood by those skilled in this art that the optical properties of the two systems are somewhat similar. In this instance there are two possible cases: Case I, in which the character image and the slit are moving in opposite directions, and Case II, in which the character image and the slit are moving in the same direction. In Case II the lens 40 projects an inverted image of the character upon the opaque member 42, and the slit reinverts the image from left to right, but not from top to bottom.

It will be observed that the time "t" is the time during which any part of the character on the film 12 is intersected by the optical axis A—A. It is dependent on the velocity of the carriage 28, but independent of M. A change of M alone changes the velocity of the character image on the member 42, but the proportionate change in the size of the image maintains the time "t" constant. Therefore, the dimension of the character at right angles to the direction of the relative motion (i. e., its height) is varied by M, but the dimension in the line of said motion (i. e., its width) remains unaffected.

As a practical matter, for purposes of designing type, Case II is of greater interest. Defining $v_1$ as the absolute speed of the character image upon the opaque member 42, and $v_2$ as the absolute speed of the slit, we have the expressions (1) $$v_1=(1+M)v_2$$

and (2) $$v_2t=v_1t-w$$

in which $w$ is the width of the character image upon the opaque member 42.

From these equations we have the expression (3) $$r_1=\frac{v_2}{v_1-v_2}=\frac{1}{M}$$

where $r_1$ is the ratio of the width of the projected image upon the film 18 to the width of the projected character image upon the opaque member 42, assuming that the lens 24 has a 1:1 ratio; and (4) $$r_2=\frac{Mv_2}{v_1-v_2}=1$$

where $r_2$ is defined as the ratio of the width of the projected character image upon the film 18 to that of the original character on the film 12.

It will be apparent from the foregoing that for the case $M=1$, the ratio $r_1$ equals unity. In this case the image upon the opaque member 42 is of the same size as the original character but is inverted therefrom. The image on the film 18 is reinverted from left to right by the slit 44. It is geometrically similar to the original character and is of the same size if the magnification ratio of the lens 24 is unity.

It will therefore be seen that a slight variation in the value of M, either above or below unity, by a change in the focus of the lens 40 and corresponding movement of the slide 6, produces either a slight expansion or condensation of the character image height relative to its width upon the film 18.

To produce slanted images of the characters the foregoing operation is modified only by slanting the slit 44 to the desired angle relative to the vertical. Ordinarily, the slant is arranged to produce a corresponding slant of the character image in the forward direction. Thus, the Roman "A" can be readily used to produce an italic. The lens 40 can be adjusted simultaneously and independently in the manner heretofore described to produce any desired change in the width of the character relative to its height.

It will be observed that in any case of the magnification in height of the image projected upon the film 18 is the product of the magnifications of the lenses 40 and 24. The distortion observed as a change in width relative to height in the character image results from the constant value of $r_2$ as shown by Equation 3 above. The distortion is unaffected by the absolute velocity of the carriage 28 during the exposure, and this velocity is adjusted to give a suitable exposure time "E," as determined by the sensitivity of the film 18 and the brilliance of the light source.

It will be apparent to those skilled in the art that the image upon the film 18 will be blurred if the slit 44 is too wide. Defining $b$ as the width of the image of an extremely narrow vertical line in the original character as it appears upon the film 18, we have $$b=\frac{v_1 d}{v_1-v_2}=\frac{(1+M)d}{M} \tag{5}$$

where $d$ is the width of the slit, and again assuming that the lens 24 has a 1:1 magnification ratio. This approximates $2d$ if the value of M is close to unity. Thus, it is highly desirable to employ as narrow a slit as can be used in order to reduce the blur.

It will be seen from the foregoing description that a relatively simple and practical device has been provided for optically distorting the images of characters upon a film and for projecting the distorted images upon a second film. Various modifications in the device may be easily effectuated. Thus while the illustrated embodiment is adapted for character transparencies, it will be obvious that the original characters may also be illuminated by reflection. Also, if it is desired to produce an immediately visual image of the character in its distorted form, rather than making an exposure on film, the carriage 28 may be arranged to oscillate back and forth through the projection axis and the film 18 may be replaced by a sheet of ground glass or other suitable material preferably coated with a phosphorescent material of relatively high image retentivity.

According to another variant, the carriage 28 may be replaced by a pivoted arm to impart arcuate motion to the lens 40 and opaque member 42. Any other mechanism for imparting a controlled motion to the lens 40 and opaque member 42 in unison may also be used, so long as an image of the character is caused in said motion to sweep across the slit 44 during the time of exposure. Various forms of distortion may thus be produced in the characters. While we have described a simplified mechanism in the form of a rectilinearly movable carriage, said mechanism can be replaced by an infinite variety of known mechanisms for imparting any desired controlled motion to the movable parts. The permissible size of the component of said motion along the projection axis, if any, will in any case depend upon the depth of field of the lenses 40 and 24 as will be understood by those skilled in this art.

Other modifications of form, arrangement, and design may also be made without departing from the spirit or scope of the invention. These will occur to those familiar with this art in the application of known principles and skills in adapting the invention to the requirements of specific applications.

Having thus described our invention, we claim:

1. Apparatus for photographing characters of type comprising means to support a character in a fixed position, a movable carriage having an opaque member provided with a translucent slit and optical means in fixed position relative to the slit to form an image of the character thereon, means for moving the carriage past the character to cause said image to move across the slit, and fixed means for projecting the light passing through said slit upon a sensitized surface.

2. Apparatus for photographing characters of type comprising means to support a character in a fixed projection axis, a movable carriage having an opaque member provided with a translucent slit, and optical means in fixed position relative to the slit to form an image of the character thereon, means for moving the carriage in a path intersecting said axis at right angles to cause said image to move across the slit, and fixed means for projecting the light passing through the slit upon a sensitized surface.

3. Apparatus for photographing characters of type comprising means to support a character in a fixed position, a movable carriage having an opaque member provided with a translucent slit and optical means to form an image of the character thereon, said slit being rotatably adjustable in a plane at right angles to the axis of said optical means and being supported after adjustment in fixed position relative thereto, means for moving the carriage past the character to cause said image to move across the slit, and fixed means for projecting the light passing through said slit upon a sensitized surface.

4. Apparatus for photographing characters of type comprising means to support a character in a fixed projection axis, a movable carriage having an opaque member provided with a translucent slit and optical means in fixed position relative to the slit to form an image of the character thereon, means for moving the carriage to move said slit and the axis of said optical means simultaneously through the projection axis and to cause said image to move across the slit, and fixed means for projecting the light passing through the slit upon a sensitized surface.

5. Apparatus for photographing characters of type comprising means to support a character in a fixed projection axis, a movable carriage having an opaque member provided with a translucent slit and variable focus optical means in fixed position relative to the slit to form an image of the character thereon, means for moving the carriage to move said slit and the axis of said optical means simultaneously through the projection axis, whereby an image of the character is focused on the slit and moved in the same direction at a velocity variable by means of said variable focus both above and below a value equal to twice that of the slit, and fixed means for projecting the light passing through the slit upon a sensitized surface.

6. Apparatus for photographing characters of type comprising means to support a character in a fixed position, a movable carriage having an opaque member provided with a translucent slit and optical means in fixed position relative to the slit to form an image of the character thereon, said optical means being adjustable to vary the size of said image, means for moving the carriage past the character to cause said image to move across the slit, and fixed means for projecting the light passing through said slit upon a sensitized surface, whereby the relative enlargements of the dimensions of the character on said surface are controlled by the adjustment of said optical means.

References Cited in the file of this patent

UNITED STATES PATENTS

| | | |
|---|---|---|
| 2,150,932 | McDonnell | Mar. 21, 1939 |
| 2,633,057 | Pratt | Mar. 31, 1953 |

FOREIGN PATENTS

| | | |
|---|---|---|
| 775,516 | France | Oct. 15, 1934 |